(12) United States Patent
 Houston

(10) Patent No.: US 8,813,465 B2
(45) Date of Patent: Aug. 26, 2014

(54) DEVICE FOR BLOCKING EJECTION OF CROP MATERIAL FROM AN AUGER PLATFORM OF AN AGRICULTURAL HARVESTER

(76) Inventor: John William Houston, Southey (CA)

( * ) Notice: Subject to any disclaimer, the term of this patent is extended or adjusted under 35 U.S.C. 154(b) by 32 days.

(21) Appl. No.: 13/466,797

(22) Filed: May 8, 2012

(65) Prior Publication Data
US 2013/0298516 A1    Nov. 14, 2013

(30) Foreign Application Priority Data
May 8, 2012 (CA) ........................................ 2777084

(51) Int. Cl.
*A01D 43/00* (2006.01)

(52) U.S. Cl.
USPC ........................................................... 56/207

(58) Field of Classification Search
USPC ......... 56/207, 122, 1, 364, DIG. 20, DIG. 24, 56/14.5, 17.4, 190
See application file for complete search history.

(56) References Cited

U.S. PATENT DOCUMENTS

| | | | | |
|---|---|---|---|---|
| 2,692,466 A * | 10/1954 | Brunts et al. | ................. | 56/320.1 |
| 2,774,210 A | 12/1956 | Kay | | |
| 3,224,177 A * | 12/1965 | Adee | ............................... | 56/153 |
| 3,646,739 A * | 3/1972 | Dahl | ............................ | 56/320.1 |
| 3,881,303 A * | 5/1975 | Krafka et al. | .................. | 56/192 |
| 4,738,091 A * | 4/1988 | Kulak et al. | .................. | 56/320.2 |
| 5,557,912 A * | 9/1996 | Voss et al. | ........................ | 56/130 |
| 2007/0204587 A1* | 9/2007 | Rosenbalm et al. | ............ | 56/119 |
| 2012/0311987 A1* | 12/2012 | Koch et al. | ....................... | 56/229 |

* cited by examiner

Primary Examiner — Thomas B Will
Assistant Examiner — Mai Nguyen
(74) Attorney, Agent, or Firm — Kyle R. Satterthwaite; Ryan W. Dupuis; Ade & Company Inc

(57) ABSTRACT

A device for blocking ejection of crop material from an auger platform of an agricultural harvester features a shield for lying along an axial direction defined by a rotational axis of an auger of the auger platform reaching forwardly over the auger, and a flexible guard attached to the shield to run along the width dimension adjacent the free edge of the shield to hang downward therefrom with the shield in the operational position. A floating connection arranged between the shield and one or more shield mounts attachment the same to the auger platform allow floating of the shield upwardly out of a normal operational position, which is user adjustable. A flexible seal maintains a sealed condition between the shield and the auger platform throughout movement of the shield and in each of several user-selectable operating positions.

18 Claims, 4 Drawing Sheets

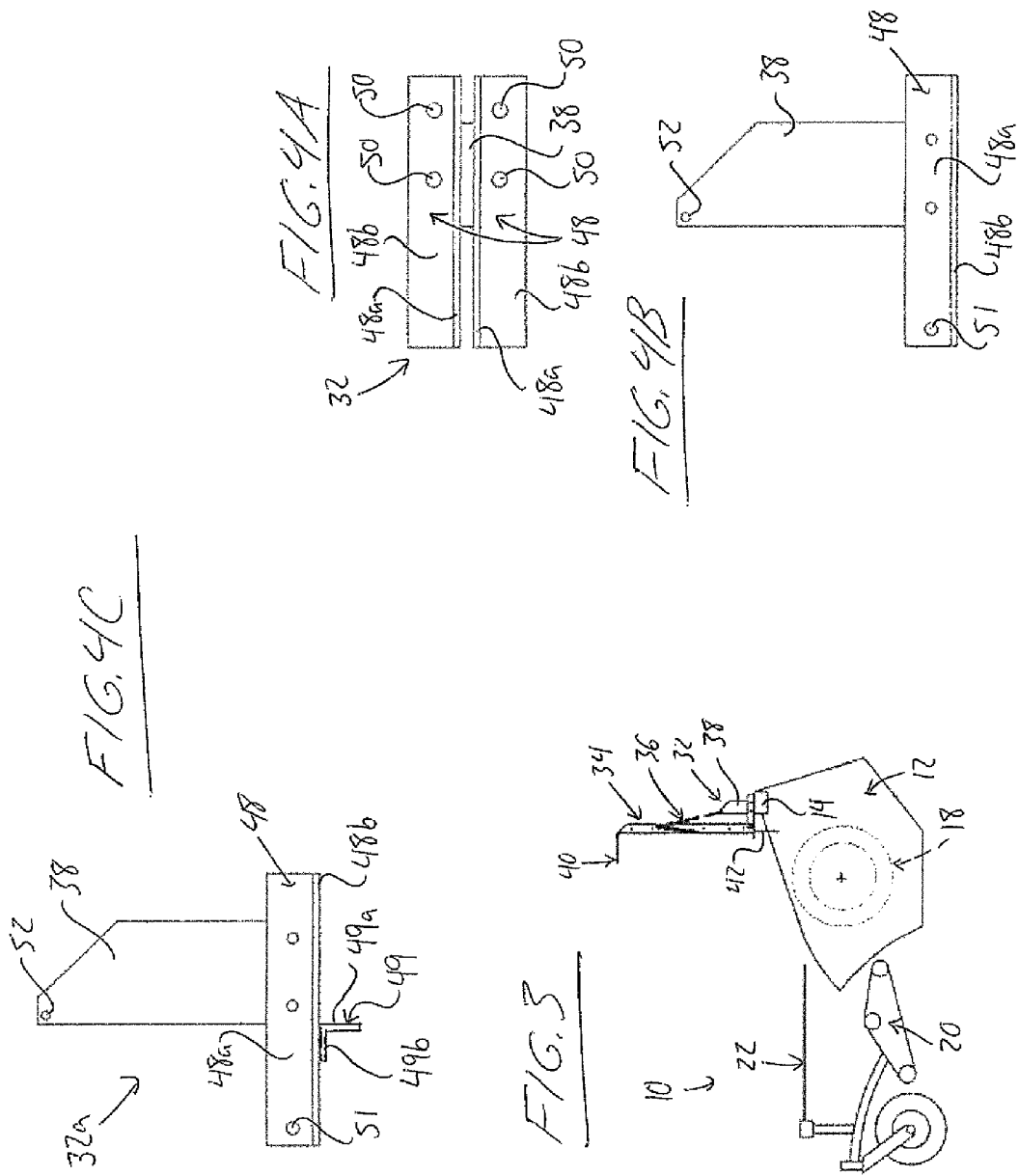

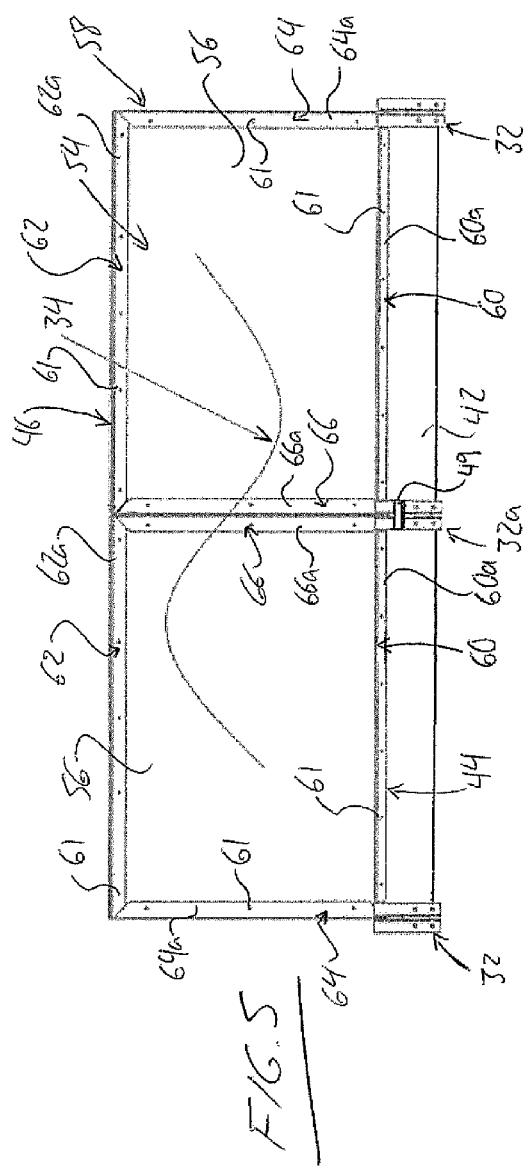
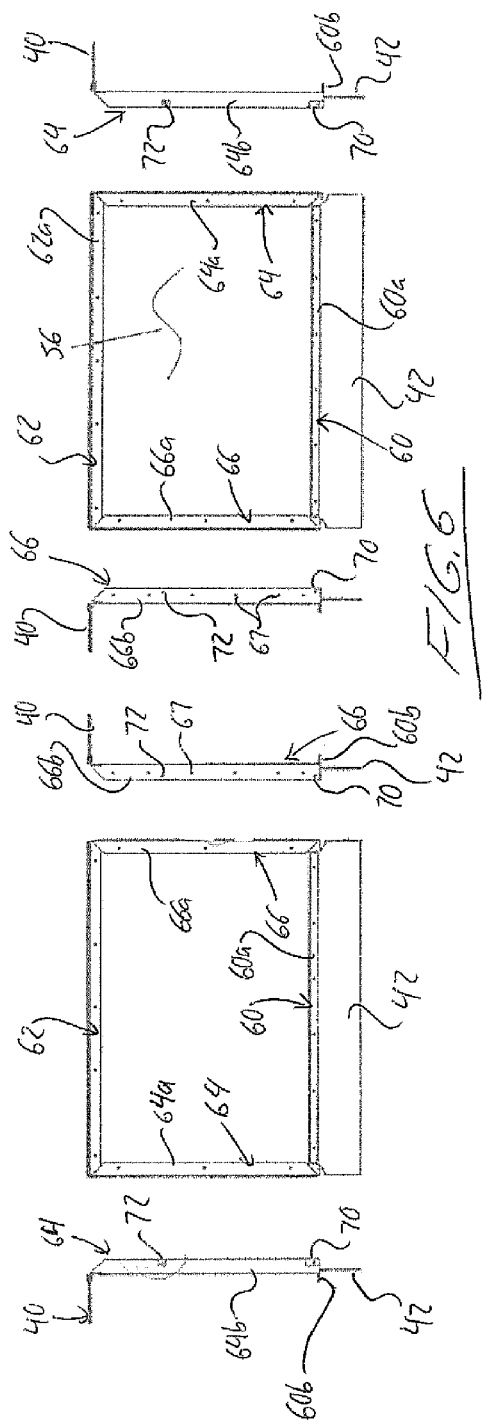

US 8,813,465 B2

DEVICE FOR BLOCKING EJECTION OF CROP MATERIAL FROM AN AUGER PLATFORM OF AN AGRICULTURAL HARVESTER

FIELD OF THE INVENTION

The present invention relates generally to combine harvesters, and more particularly to device for blocking ejection of seeds from an auger platform of a combine harvester to minimize seed loss during harvest operations.

BACKGROUND OF THE INVENTION

Combine harvesters employ removable headers, sometimes called tables or platforms, for collecting crop material from the field into a feed housing of the combine from which the crop material is conveyed onward for threshing and separating.

Types of platforms include a cutting platforms, with a sickle knife cutter bar and rotating reel for cutting and collecting the crop material, among which there are auger-type cutting platforms that employ cross augers to convey cut material toward the lateral center at the rear of the header for entry to the feed housing, and draper-type cutting platforms that employ rubbers belts instead of augers to feed the material to the feed housing. Draper platforms include designs with flexible cutter bars that can better follow the contours of the ground to provide more effective collection of crop material compared to platforms with rigid cutter bars.

Other platforms include pickup platforms, which instead of cutting the material from the field, are design to pick-up previously windrowed crop material from the field, for example using tines that cooperate with a belt or draper to lift the windrowed crop material and convey it back to a cross auger for centrally delivering the collected material to the feed housing.

A known problem with auger-type platforms is seed loss due to the aggressive nature of the table augers in current pickup, rigid and flexible, combine platforms. That is, a notable volume of seed material is ejected upwardly out of the auger platform, and thus not than fed onward through the combine.

Prior attempts to address this issue include U.S. Pat. No. 2,774,210, which teaches a curved shield mounted to the platform to curve forwardly and downwardly over the auger from above and behind the auger, and a more recent product available from Michel's Industries Ltd. of St. Gregor, Saskatchewan, under the name Crop Catcher, which mounts at a similar location on the platform, but resides in a more upright orientation residing primarily behind the auger.

However, there remains room for improvement, and Applicant has developed an improved shield incorporating unique and advantageous features not heretofore seen in the prior art.

SUMMARY OF THE INVENTION

According to a first aspect of the invention there is provided a device for blocking ejection of crop material from an auger platform of an agricultural harvester, the device comprising:

a shield having a width dimension for lying along an axial direction defined by a rotational axis of an auger of the auger platform, the shield having a mounting edge running along the width dimension and an opposing free edge of the shield also running in the width dimension; and one or more shield mounts arranged to attach the shield to the auger platform along the mounting edge of the shield at a position behind the auger in order to carry the shield in an operational position reaching forwardly over the auger to block ejection of crop material from the auger, with a span of the shield between the mounting edge and the opposing free edge being large enough to extend sufficiently far forward in the operating position to reach a vertical plane that is located ahead of the rotational axis of the auger in an orientation tangential to a diameter of the auger; and a guard attached to the shield to run along the width dimension adjacent the free edge of the shield to hang downward therefrom with the shield in the operational position.

Preferably the span of the shield is large enough to reach forwardly past the vertical plane.

Preferably the span of the shield is large enough to reach forwardly past the auger.

The span of the shield may be large enough to reach forwardly over a trailing end of a wind guard situated over a draper pickup of the agricultural harvester.

Preferably there is provided a floating connection between the shield and the one or more shield mounts to allow floating of the shield upwardly out of the operational position.

Preferably the floating connection comprises a pivotal connection by which the shield is pivotal upward out of the operational position.

Preferably there are provided one or more flexible members coupled between the one or more shield mounts and the shield to suspend the shield in the operational position.

Preferably a length of each flexible member between connections thereof to the shield and to one or more shield mounts is adjustable to enable user adjustment of the operational position.

Preferably each flexible member is a chain.

Preferably there is provided a flexible seal attached to the shield adjacent the mounting edge to seal against the auger platform with the shield in the operational position and during movement of the shield out of the operational position.

Preferably the guard is flexible.

Preferably the guard is of greater flexibility than the shield.

Preferably the guard comprises rubber.

According to a second aspect of the invention there is provided a device for blocking ejection of crop material from an auger platform of an agricultural harvester, the device comprising:

a shield having a width dimension for lying along an axial direction defined by an auger of the auger platform, the shield having a mounting edge running along the width dimension and an opposing free edge of the shield also running in the width dimension;

one or more shield mounts arranged to attach the shield to the auger platform along the mounting edge of the shield at a position behind the auger in order to carry the shield in a user-adjustable operational position extending forwardly over the auger to block ejection of crop material from the auger;

a floating connection arranged between the shield and the one or more shield mounts to allow floating of the shield upwardly out of the user-adjustable operational position; and an adjustment mechanism operable to set the user-adjustable operational position.

Preferably the adjustment mechanism comprises one or more flexible members from which the shield is suspended, and an effective length of each flexible member between a connection thereof to the shield and a connection thereof to the one or more shield mounts is adjustable in order to set the user-adjustable operational position.

Preferably each flexible member comprises a chain, and for one or both of the connection to the shield and the connection to the one or more shield mounts, links of the chain define user-selectable connections points by which selection of different links provide a different effective chain length between the connections.

Preferably a flexible seal is attached to the shield adjacent the mounting edge to seal against the auger platform in different shield positions achievable through the adjustment mechanism.

According to a third aspect of the invention there is provided a device for blocking ejection of crop material from an auger platform of an agricultural harvester, the device comprising:

a shield having a width dimension for lying along an axial direction defined by an auger of the auger platform, the shield having a mounting edge running along the width dimension and an opposing free edge of the shield also running in the width dimension;

mounting elements arranged to attach the shield to the auger platform along the mounting edge of the shield at position behind the auger to carry the shield in a condition blocking ejection of crop material from the auger;

a movable connection arranged between the shield and the mounting elements to allow movement of the shield relative to the auger platform; and a flexible seal extending along the width dimension of the shield adjacent the mounting edge thereof to close off a space between the shield and the auger platform in each of a plurality of shield positions attainable via the movable connection.

Preferably the flexible seal is arranged to open between the shield and the auger platform under movement of the shield into a retracted position withdrawn from over the auger.

BRIEF DESCRIPTION OF THE DRAWINGS

In the accompanying drawings, which illustrate exemplary embodiments of the present invention:

FIG. 3 is a schematic side elevational view of the combine harvester pickup platform of FIG. 1 with the seed saving device in a retracted position revealing access to the auger when not in use.

FIG. 4A is an overhead plan view of a side mounting bracket of the crop material shield.

FIG. 4B is a side elevational view of the side mounting bracket of FIG. 4A.

FIG. 4C is a side elevational view of a center mounting bracket of the crop material shield.

FIG. 5 is a bottom plan view of the assembled seed saving device in isolation from the combine harvester platform.

FIG. 6 is a schematic illustration showing side and bottom plan views of panel sections to be assembled to form the shield of the seed saving device.

DETAILED DESCRIPTION

The following description outlines a hinged, floating, belted, aluminum framed, poly carbonate paneled shield for targeting complete retention of seed normally lost due to the aggressive nature of the augers on pickup, rigid and flexible, auger style combine platforms. The design improves on the prior art solutions outlined above by providing substantially full coverage by reaching forwardly over the auger, while employing a floating, adjustable configuration where the normal position of the shield can be adjusted by an owner/operator for optimal performance and the shield can float upward out of this position under a lifting action by crop material under the shield in order to minimize clogging of the crop material on the platform. With its intended function of preventing seed loss, the apparatus may be referred to as a seed saving device or seed saver. It is contemplated that the invention may be promoted using the namesake of its inventor, for example as the Houston Seed Saver.

Figure 1:
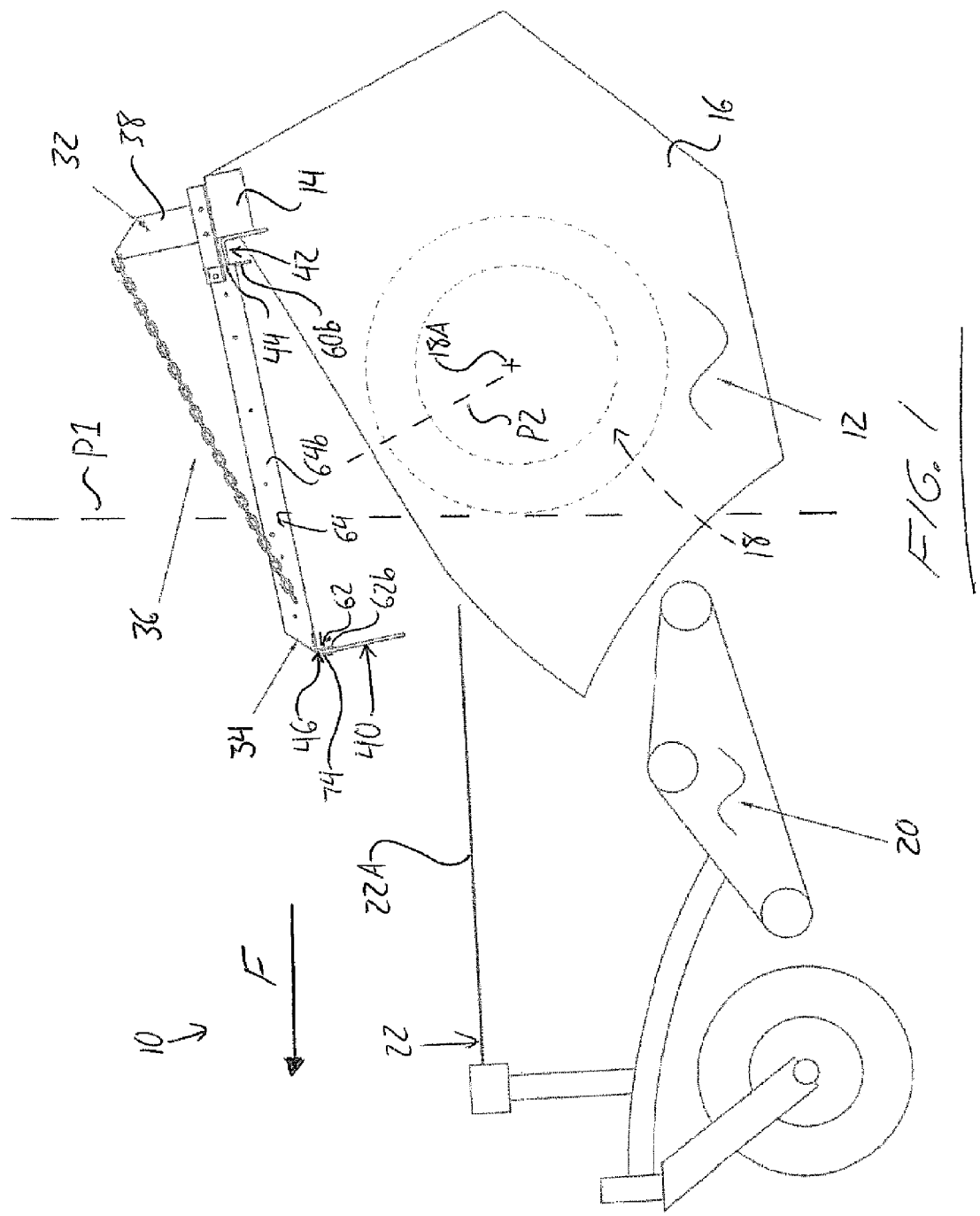
FIG. 1 is a schematic side elevational view of a combine harvester pickup platform illustrating use of a seed saving device according to the present invention, which has a shield projecting forwardly over the cross auger at the rear of the platform to block ejection of normally-lost seed material from the platform by the action of the auger.
Figure 2:
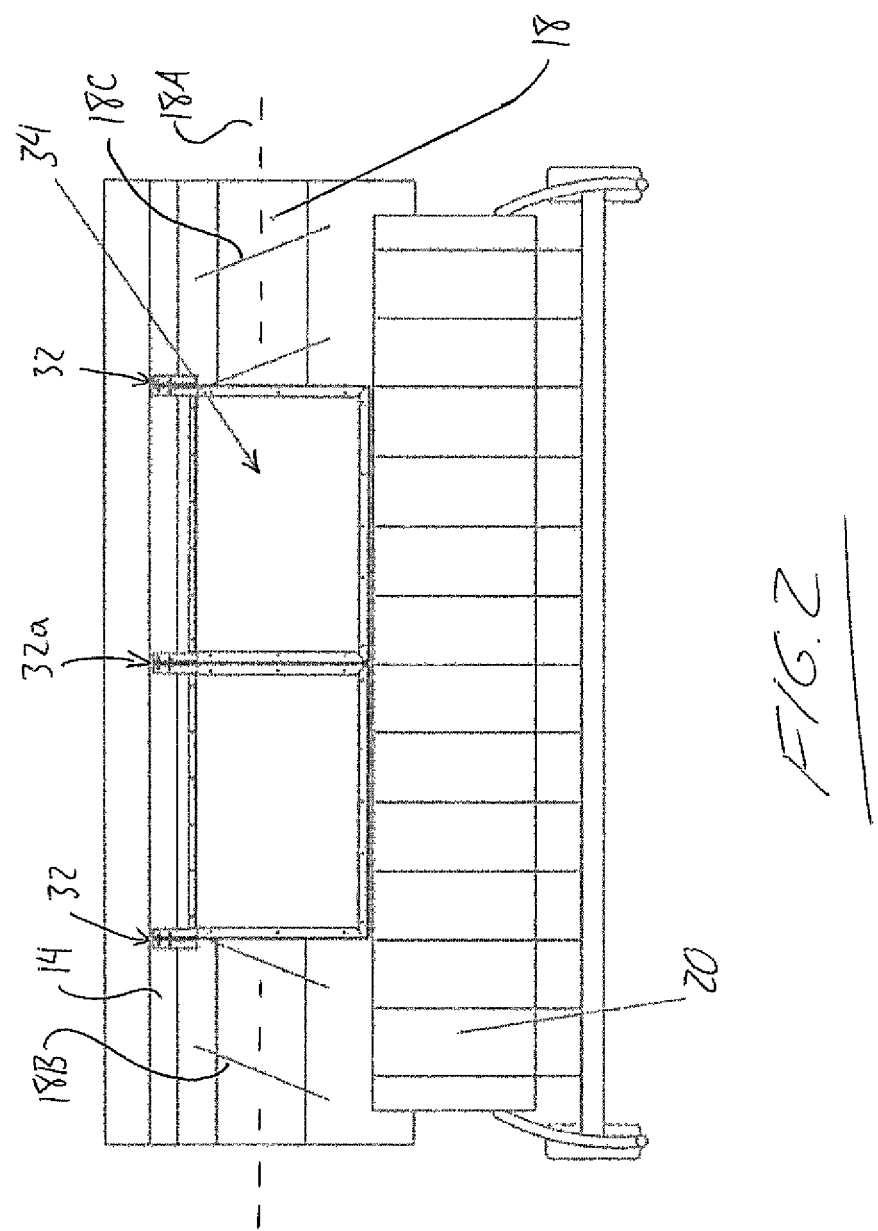
FIG. 2 is a schematic overhead plan view of the combine harvester pickup platform of FIG. 1.

FIG. 1 shows a schematic side view of a combine harvester pickup platform 10 with an auger header 12 that runs in a transverse direction perpendicular to the longitudinal direction of the combine at the leading end thereof. The auger header 12 includes a support frame featuring a header beam 14 running in the transverse direction between a pair of end walls, one of which is shown at 16. An auger 18 is rotatably supported between the end walls 16 for driven rotation about an axis 18A parallel to the header beam 14. The auger 18 has oppositely pitched flighting 18B, 18C extending toward the center of the auger so as to converge material toward the opening of the feed house of the combine, which is located behind this central portion of the auger 18, when the auger is driven in a predetermined rotational direction. A draper pickup 20 situated ahead of the auger 18 operates to pickup crop material previously laid out in the field by a swather or windrower, and convey it rearward to the auger for convergence and entry to the feed housing, from which the collected crop material is conveyed onward for further processing in the combine. A wind guard 22 is provided in the form of a set of fingers supported on the platform ahead of the draper pickup 20, and pointing rearwardly toward the auger 18 at a height over the draper pickup 20. It will be appreciated that this arrangement of parts is a conventional layout, and thus described herein in only brief detail to set the context for a seed saving device 30 of the present invention.

Referring to FIG. 1, the seed saving device 30 features a set of shield mounting brackets 32, 32a arranged to fasten in place atop the header beam 14 at spaced positions therealong, a panel assembly 34 hinged to the shield mounting brackets 32, 32a for pivoting relative thereto about a horizontal pivot axis that lies parallel to the auger axis 18A and header beam 14, a set of link chains 36 each having one end secured to the panel assembly at a distance ahead of the shield mounts 32, 32a and the other end secured to an upright 38 of a respective one of the shield mounting brackets 32, 32a in order to suspend the panel assembly 34 from its hinge in a position projecting forwardly over the auger 18 at a height thereabove, a flexible guard 40 hanging from the panel assembly 34 along a widthwise free edge thereof opposite the hinged edge pivotally mounted to the brackets 32, 32a, and a flexible seal 42 attached to the widthwise mounting edge of the panel assembly to seal off the space between the panel assembly and the header beam 14. The panel assembly forms a shield overlying the auger 18 to block upward ejection of seeds therefrom.

The suspension of the panel assembly by the link chains defines a normal operational position in which the panel assembly extends forwardly over the auger, while the flexibility of the chains allows the panel assembly to float or ride up from this normal position under force exerted against the panel assembly from below by crop material. The normal position of the panel assembly can be adjusted by changing the effective lengths of the link chains, for example by disconnecting each chain from the panel assembly, and then reconnecting each chain to the panel assembly at a different link on that chain. The panel assembly is thus floating, and position-adjustable. The flexible seal 42 is arranged to keep the space between the panel assembly and the header beam 14 entirely closed off throughout an attainable range of useful panel positions reaching forwardly over the auger in order to better close off the top side of the auger support frame by preventing a space from opening between the pivot mounted edge of the panel and the header beam. The flexible guard 40 hanging from the front end of the panel assembly further improves the seed-loss prevention action of the device by blocking forward ejection of seed from the auger, while the flexibility of the guard minimizes interference with the flow of crop material, and also minimizes interference with, or damage or wear to, the wind guard. Further details of the illustrated embodiment are provided below.

A rear mounting edge 44 of the panel assembly 34 lies parallel to the header beam 14 and auger axis 18A, and free forward edge 46 of the panel assembly 34 lies parallel to the rear mounting edge 44. The length of these parallel edges 44, 46 defines a width of the panel assembly, which is wide enough to extend past the combine feeder house throat opening, found behind the central portion of the auger, for all platforms for which the unit is intended for use. One embodiment may be eight feet wide, for example comprised of two, four-foot panels bolted together end-to-end to extend eighteen to twenty-four inches past the left and right edges of the combine platform openings.

The panel assembly 34 is deep enough (i.e. large enough in span from the forward facing edge 46 to the hinge point atop the combine platform at the rear mounting edge 44) to extend beyond the "Smash Point" where the impact damage on the crop is done by the combine platform auger fingers, i.e. retractable fingers that project outward from the shaft of the auger at the unflighted central portion thereof in front of the feed house opening. This "Smash Point" is typically considered to be at a 10-11 o'clock position of the auger fingers at where they extend from the auger shaft when viewed from the left hand end of the platform (the 'left' of the platform meaning the left hand side thereof when facing in the forward working direction in which the combine is driven during harvest operations).

With reference to FIG. 1, depth of the panel assembly in the illustrated embodiment is sufficient large to reach forwardly past a vertical plane P1 that is located ahead of the rotational axis 18A of the auger 18 in an orientation tangential to a diameter of the auger. In doing so, the panel assembly also reaches past a plane P2 that extends radially from the auger axis 18A and marks the 11 o'clock position therearound (i.e. a plane tilted to angle 30-degrees forward and upward from a vertical plane containing the auger axis 18A). The panels reach sufficiently far forward (in the working direction F in which the combine harvester is driven) to reach a short distant past the rear or trailing ends of the wind guard fingers 22A and the rear or trailing end of the draper pickup 20 therebeneath. One embodiment may use 32-inch deep panels for use on pickup platforms, while another embodiment may use 24-inch deep panels for rigid and flexible cutting platforms. The reason to consider employing smaller panels for cutting platforms is so that the panels do not interfere with the space in which a rotatable reel is operable in front of the auger of a cutting platform for the purpose of clearing cut crop material rearward from the cutterbar.

As describe above, the panel assembly 34 hinges and floats on the combine platform mounting brackets 32, 32a. The illustrated embodiment hinges on three of the combine platform mounting brackets 32, 32a and is suspended by three adjustable-length chains extending respectively from the mounting bracket towers or uprights 38 to the panel assembly 34. The guard 40 may be made of flexible belt-rubber or similar material. The chain-adjustable position of the panel assembly allows vertical adjustment of the throat opening defined below the front guard belting 40 to adjust for the depth of crop windrows being picked with a pickup platform, or to allow for clearance between the panels and the reels on rigid and flexible combine cutting platforms.

As shown in FIG. 3, hinging of the panel assembly 34 on the platform header beam 14 allows the combine operator to raise the panels to a fully vertical retracted position, or possibly a rearwardly over-center retracted position, in which the panel assembly is withdrawn from over the auger in order to gain access and enable servicing of the combine platform auger 18 or removal of rocks from the platform. A clip may be provided on the left hand chain to retain the panels in a vertical position for operator safety, for example by selectively clipping together non-adjacent links of the chain near opposite ends thereof to take up slack in the chain, or by clipping to a suitable anchor point somewhere on the auger platform. Clipping of one chain is sufficient to hold the panel assembly in place, but an additional clip may be provided on or more of the other chains. Clipping of at least the left hand chain is preferable, as combine harvesters typically have the access door to the operator cabin located on the left side of the machine. This way, an operator has convenient access to the clip-equipped chain upon exiting the operator cabin. In the illustrated embodiment, the panel assembly's hinge point is a short distance ahead of the top frame member or header beam 14 of the platform 10, for example three inches therefrom. This way, when the panel assembly is raised to the vertical position any trash or dust which may have accumulated on the top of the panels, simply falls back into the platform.

Regarding the floating of the panel assembly 34, when the combine operator allows the auger and feeder house to become plugged with crop material, a large volume of crop material will be discharged forward of the platform auger 18 when the feeder house and auger are reversed. Under this reversing action, the retractable fingers on the auger force this material upwards and try to carry the material back around the top of the auger. If the panel assembly was not allowed to float upwards, this mat of material would further plug between panel assembly and the auger.

FIG. 4 illustrates the form of each mounting bracket 32, 32a of the illustrated embodiment. FIGS. 4A and 4B show side mounting brackets 32 for use at respective sides of the panel assembly, while FIG. 4C shows a slightly different center mounting bracket 32a. The upright portion 38 of each bracket is defined by a flat plate sandwiched in a vertical plane between the upright legs 48a of two pieces of metal angle 48, the other bottom legs 48b of which are positioned flush with one another to form a flat underside of the bracket to seat flush atop the header beam 14 of the auger platform 12. Fastener holes 50 in the bottom legs of the angle pieces 48 are used to fasten the mounting bracket 32, 32a to the header beam 14. A pivot pin hole 51 in the upright leg of each angle piece 48 aligns with a matching hole in the upright leg of the other angle piece to define a passage for receipt of a bolt or other suitable pivot pin for hinging the panel assembly to the brackets 32, 32a. The angles 48 project from their mounted position atop the header beam to position the pivot hole 51 ahead of the beam for the reason outlined above.

Near the top end of the upright plate 38, a connection hole 52 passes through the plate 38 to form a point at which a respective one of the chains 36 connects to the bracket 32, 32a, for example by engagement of the clevis pin of a clevis fastener through the connection hole 52 via one of the links in the chain. In one embodiment, the three mounting brackets are made of aluminum angle and aluminum plate to provide a high strength to weight ratio, and are retained to the top of the combine platform by using twelve (4 per bracket) ⅜-inch×1-inch self threading bolts. All hardware used in contact with the aluminum may be stainless steel in order to avoid corrosion issues with the aluminum, thus ensuring that the aluminum finish will retain an attractive appearance throughout the life of the unit.

The center bracket 32a of FIG. 4C differs from the side bracket structure 32 of FIGS. 4A and 4C only in the addition of an extra metal angle 49 fixed to the underside of the two angles 48 of the base just ahead of the upright plate 38. This additional angle piece 49 runs perpendicular to the angles 48 of the base, with its depending leg 49a projecting perpendicularly downward from the base angles 48 at an intermediate location between the fastener holes 50 and the pivot pin hole 51 of each base angle 48, and its other leg 49b extending flush along the underside of the base toward the pivot pin hole 51. The depending leg 49a thus faces rearward for placement against the leading edge of the header beam 14 to set the desired overhang distance of the mounting bracket base from the header beam for pivotal support of the panel assembly ahead of the header beam. Placement of the flat rear face of the depending leg 49a of the angle 49 also ensures the base angles 48 of the bracket 32a are placed perpendicular to the header beam 14 so that the hinge axis of the panel assembly runs parallel to the beam 14. A one-inch by one-inch aluminum angle bracket may be used as this extra angle piece for locating the centre mounting bracket, for example to establish a three-inch overhang dimension from the front of the combine platform header beam 14 to the panel hinge point 51. The center bracket 32a is mounted on the beam 14 first during installation of the device, particularly over the center of the feed house throat opening. Connection of the panel assembly to the properly positioned and oriented center bracket 32a can then be used to dictate the appropriate mounting positions of the two side brackets 32 on the header beam 14.

Turning to FIGS. 5 and 6, the panel assembly 34 of the illustrated embodiment features two panel sections 54 assembled together to form the overall shield. Each panel section 54 features a planar panel 56 reinforced along the perimeter edges thereof by a border frame 58. Along the rear edge of each panel 56 (defining a respective half of the overall panel assembly's mounting edge 44) and the opposing parallel front edge (defining a respective half of the overall panel assembly's free edge 46), the frame features downturned metal angles 60, 62 running along these panel edges with one leg 60a, 62a of each angle attached to the underside of the panel (i.e. the side thereof facing the auger 18) by fasteners 61 and the other leg 60b, 62b projecting perpendicularly to this underside of the panel. At the two side edges of each panel 56, the frame features respective upturned metal angles 64, 66 running along these panels edges with one leg 64a, 66a of each angle 64, 66 likewise fastened to the underside of the panel, and the other leg projecting perpendicular from the first leg to the topside of the panel assembly (i.e. the side thereof facing away from the auger 18). As shown, the frame members may be mitre cut at their ends so that their flush legs on the underside of the panel meet at a diagonal at each corner thereof. As shown in FIG. 6, the upturned metal angles 66 at the abutted-together inner sides of the panels 56 feature aligned through holes 67 in their upturned legs 66b for bolting of these legs together to fasten the two panel assemblies to one another.

The upturned legs 64b of the upturned metal angles 64 at the two outer sides of the panel assembly 34, at the ends of angle's corresponding to the mounting edge 44 of the panel assembly 34, are respectively received between the upright legs 48a of the bases of the outer two of the mounting brackets 32, where a pivot pin hole 70 in each of these upturned legs 64b of the panel frames aligns with the pivot holes 52 in the upright legs 48a of the respective mounting bracket 32 in order to receive a respective pivot pin. Another through-hole 72 in the upturned leg 64b of the metal angle 64 at each side of the panel assembly 34 is located nearer the free edge 46 of the panel assembly to form the point at which a respective one of the link chains 36 is attachable to the panel assembly, for example by fastening the clevis pin of a clevis fastener through the hole 72 via a selected link in the chain. The fastened-together upturned legs 66b of the upturned metal angles 66 at the abutted-together inner sides of the panel sections 54 are similarly received between the upright legs 48a of the base of the middle mounting bracket 32a on the header beam 14 for pivotal coupling thereto by a suitable pivot pin and connection to the third link chain, thus completing the hinged, floating connection of the panel assembly to the auger platform.

The panel assembly 34 should be lightweight enough for the combine operator to easily lift the panels to a vertical position in a manual fashion. In one embodiment, the panel assembly may employ a frame made of 3/16" T-6061 aluminum for a suitable balance between maximum strength and minimum weight, and ¼-inch thick Lexan or Mar guard (MR-10) Polycarbonate panels. These panels are used primarily for their strength and durability, as operator visibility becomes limited due to dust accumulation on the panels, although the transparent or translucent character of such panels does provide for some relative visibility versus an opaque panel design. These panels also allow the frames to flex to some degree, for example during reversing of the auger, where crop material is forced up against the panels. The combined weight of the two panels is only 65 pounds for the aforementioned 32-inch panels, and about 58 pounds for the 24-inch panels, and so the panel assembly is easily raised by manually pulling on the left hand suspension. The lightweight, manually operable, simple hinge design avoids the added complexity that would be introduced by attempts to provide a mechanized or powered panel lifting means, which may further complicate the issue of 'floating' the shield.

The guard 40 at the free forward edge 46 of the panel assembly 34 is provided in the form of two elongated strips of rubber-belting or other flexible material whose longitudinal dimensions run along this edge, with the strips placed end-to-end with one another, and each attached to a respective one of the two panel sections. The strip of each panel section may be fastened secured in place by fastening an upper end of the strip's width to the downturned leg 62b of the metal angle 62 at this front edge of the panel section, for example sandwiching this longitudinal edge-adjacent portion of the strip between the metal angle 62 and a flat bar 74 placed thereagainst, as shown in FIG. 1, and bolting the flat bar and angle together through this edge-adjacent portion of the strip. In one embodiment, the remainder of the strip is suspended 6-inches below the bottom of the panels, which has been found to be an effective length prevent or minimize seed loss that occurs as a result of seed being shot forward by the combine auger fingers. This front belting 40 also acts as a wind brake and creates a dead air zone under the panels in high winds. This allows the combine to be operated in high wind conditions where seed losses would normally be extreme.

The flexible seal 42 at the rear mounting edge 44 of the panel assembly may also be made of strips of rubber-belting respectively fastened to the two panel sections to run end-to-end along the edge of the panel assembly, and may be held in place in a similar manner, for example by fastening an edge-adjacent portion of the strip in place between the topside of the panel 56 and a flat bar mounted thereover along the rear edge, and bolting the flat bar in place through the panel, the edge-adjacent portion of the rubber strip, and the leg 60a of the downturned angle 60 on the underside of the panel. The rubber strip 42 may for example be a 7-inch wide strip of 3-ply rubber belting. As shown in FIG. 1, the width of the strip 42 projects past the rear edge of the topside of the panel, and exceeding the width of the gap between this rear edge of the panel and the header beam, the belt is forced into a curved or bent condition turning downward between the panel and the header. The resiliency of the rubber strip acts to continuously force the free edge of the strip away from the edge of the panel, thus biasing it against the header beam. Accordingly, the rubber belting forms and maintains a complete seal between the panels and the platform frame, so long as the panel assembly is not lifted out of its useful operational position over the auger 18.

It will be appreciated that materials and dimensions other than those specified in the detailed description of preferred embodiments may be employed within the scope of the present invention. Likewise, many structural details of the shield, the mounting brackets, and the connections therebetween may be modified without detriment to the advantages of the floating, adjustable shield operability they provide.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A device for blocking ejection of crop material from an auger platform of an agricultural harvester, the device comprising:
    a shield having a width dimension for lying along an axial direction defined by an auger of the auger platform, the shield having a mounting edge running along the width dimension and an opposing free edge of the shield also running in the width dimension;
    mounting elements arranged to attach the shield to the auger platform along the mounting edge of the shield at position behind the auger to carry the shield in a condition blocking ejection of crop material from the auger;
    a movable connection arranged between the shield and the mounting elements to allow movement of the shield relative to the auger platform; and
    a flexible seal extending along the width dimension of the shield adjacent the mounting edge thereof to close off a space between the shield and the auger platform in each of a plurality of shield positions attainable via the movable connection;
    wherein the flexible seal is arranged to open between the shield and the auger platform under movement of the shield into a retracted position withdrawn from over the auger.

2. The device of claim 1 wherein the movable connection is operable to allow movement of the shield into and out of an operational position reaching forwardly over the auger to block ejection of crop material from the auger, with a span of the shield between the mounting edge and the opposing free edge being large enough to extend sufficiently far forward in the operating position to reach a vertical plane that is located ahead of a rotational axis of the auger in an orientation tangential to a diameter of the auger, and a guard is attached to the shield to run along the width dimension adjacent the free edge of the shield to hang downward therefrom with the shield in the operational position.

3. The device of claim 2 where the span of the shield is large enough to reach forwardly past the vertical plane.

4. The device of claim 2 wherein the span of the shield is large enough to reach forwardly past the auger.

5. The device of claim 2 wherein the span of the shield is large enough to reach forwardly over a trailing end of a wind guard situated over a draper pickup of the agricultural harvester.

6. The device of claim 1 wherein the movable connection is a floating connection between the shield and the mounting elements to allow floating of the shield upwardly out of an operational position reaching forwardly over the auger to block ejection of crop material therefrom.

7. The device of claim 6 wherein the floating connection comprises a pivotal connection by which the shield is pivotal upward out of the operational position.

8. The device of claim 6 comprising one or more flexible members coupled between the mounting elements and the shield to suspend the shield in the operational position.

9. The device of claim 8 wherein a length of each flexible member between connections thereof to the shield and to one of the mounting elements is adjustable to enable user adjustment of the operational position.

10. The device of claim 8 wherein each flexible member is a chain.

11. The device of claim 6 wherein the flexible seal is arranged to seal against the auger platform with the shield in the operational position and during movement of the shield into out of the operational position.

12. The device of claim 1 wherein the movable connection is a pivotal connection between the shield and the mounting elements.

13. The device of claim 2 wherein the guard is flexible.

14. The device of claim 2 wherein the guard is of greater flexibility than the shield.

15. The device of claim 2 wherein the guard comprises rubber.

16. The device of claim 1 wherein the movable connection carries the shield in a user-adjustable operational position extending forwardly over the auger to block ejection of crop material from the auger;
    the movable connection is a floating connection arranged between the shield and the mounting elements to allow floating of the shield upwardly out of the user-adjustable operational position; and
    an adjustment mechanism associated with the shield is operable to set the user-adjustable operational position.

17. The device of claim 16 wherein the adjustment mechanism comprises one or more flexible members from which the shield is suspended, and an effective length of each flexible member between a connection thereof to the shield and a connection thereof to the mounting elements is adjustable in order to set the user-adjustable operational position.

18. The device of claim 17 wherein each flexible member comprises a chain, and for one or both of the connection to the shield and the connection to the mounting elements, links of the chain define user-selectable connections points by which selection of different links provide a different effective chain length between the connections.

* * * * *